(12) United States Patent
Liu et al.

(10) Patent No.: US 9,625,061 B2
(45) Date of Patent: *Apr. 18, 2017

(54) MULTILAYER FLEXIBLE TUBING

(71) Applicant: SAINT-GOBAIN PERFORMANCE PLASTICS CORPORATION, Solon, OH (US)

(72) Inventors: Zhizhong Liu, Shrewsbury, MA (US); Charles Golub, Westford, MA (US); Heidi Sardinha, Shrewsbury, MA (US); Wayne Edward Garver, Hudson, OH (US); Mark Colton, Rootstown, OH (US); Mark Simon, Pascoag, RI (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 166 days.

This patent is subject to a terminal disclaimer.

(21) Appl. No.: 14/261,578

(22) Filed: Apr. 25, 2014

(65) Prior Publication Data

US 2014/0234561 A1 Aug. 21, 2014

Related U.S. Application Data

(62) Division of application No. 12/609,829, filed on Oct. 30, 2009, now Pat. No. 8,747,978.

(Continued)

(51) Int. Cl.
*B32B 1/08* (2006.01)
*F16L 11/04* (2006.01)

(Continued)

(52) U.S. Cl.
CPC ............ *F16L 11/04* (2013.01); *B29C 47/065* (2013.01); *B32B 1/08* (2013.01); *B32B 27/08* (2013.01);

(Continued)

(58) Field of Classification Search
CPC ....... F16L 11/00; F16L 11/04; Y10T 428/139; Y10T 428/1393; B29C 47/0026; B29C 47/065

(Continued)

(56) References Cited

U.S. PATENT DOCUMENTS 4,900,301 A  2/1990 Morris et al.
5,439,454 A  8/1995 Lo et al.

(Continued)

FOREIGN PATENT DOCUMENTS

CN  1197423 A  10/1998
JP  63-115742 A  5/1988

(Continued)

OTHER PUBLICATIONS

International Search Report for PCT/US2009/062809 dated May 3, 2010, 4 pgs.

(Continued)

*Primary Examiner* — Walter B Aughenbaugh
(74) *Attorney, Agent, or Firm* — Abel Law Group, LLP; Chi Suk Kim (57) ABSTRACT

A flexible tube includes a first layer comprising a polyolefin material having a flexural modulus of not greater than 150 MPa and includes a second layer directly bonded to and in direct contact with the first layer. The second layer comprising a blend of propylenic polymer and styrenic block copolymer.

20 Claims, 1 Drawing Sheet

Related U.S. Application Data (60) Provisional application No. 61/110,336, filed on Oct. 31, 2008.

(51) Int. Cl.

| | | |
|---|---|---|
| *F16L 11/00* | (2006.01) | |
| *B29C 47/06* | (2006.01) | |
| *B32B 27/32* | (2006.01) | |
| *F16L 11/06* | (2006.01) | |
| *B32B 27/08* | (2006.01) | |
| *B32B 27/20* | (2006.01) | |
| *B32B 27/22* | (2006.01) | |
| *B32B 27/30* | (2006.01) | |
| *B29C 47/00* | (2006.01) | |
| *B29K 23/00* | (2006.01) | |
| *B29K 25/00* | (2006.01) | |
| *B29K 105/00* | (2006.01) | |
| *B29L 23/00* | (2006.01) | |

(52) U.S. Cl.
CPC .............. *B32B 27/20* (2013.01); *B32B 27/22* (2013.01); *B32B 27/302* (2013.01); *B32B 27/32* (2013.01); *F16L 11/00* (2013.01); *F16L 11/06* (2013.01); *B29C 47/0004* (2013.01); *B29C 47/0026* (2013.01); *B29K 2023/12* (2013.01); *B29K 2025/00* (2013.01); *B29K 2105/0085* (2013.01); *B29L 2023/22* (2013.01); *B32B 2250/24* (2013.01); *B32B 2264/10* (2013.01); *B32B 2264/102* (2013.01); *B32B 2264/107* (2013.01); *B32B 2270/00* (2013.01); *B32B 2307/4026* (2013.01); *B32B 2307/414* (2013.01); *B32B 2307/7145* (2013.01); *Y10T 428/139* (2015.01); *Y10T 428/1393* (2015.01)

(58) Field of Classification Search
USPC .................................................... 264/171.28
See application file for complete search history.

(56) References Cited

U.S. PATENT DOCUMENTS

| | | | |
|---|---|---|---|
| 5,741,452 A | 4/1998 | Ryan et al. | |
| 5,928,744 A | 7/1999 | Heilmann et al. | |
| 6,129,876 A | 10/2000 | Qin et al. | |
| 6,576,310 B2 | 6/2003 | Shimada | |
| 6,632,541 B2* | 10/2003 | Johoji ............... | C08L 23/10 |
| | | | 428/474.4 |
| 6,846,535 B2 | 1/2005 | De Groot et al. | |
| 6,977,105 B1 | 12/2005 | Fujieda et al. | |
| 7,271,209 B2 | 9/2007 | Li et al. | |
| 7,641,753 B2 | 1/2010 | Ahr et al. | |
| 8,071,681 B2 | 12/2011 | Iyer et al. | |
| 8,747,978 B2* | 6/2014 | Liu ................... | B29C 47/065 |
| | | | 138/137 |
| 2002/0164492 A1 | 11/2002 | Nebgen et al. | |
| 2009/0205776 A1 | 8/2009 | Datta et al. | |

FOREIGN PATENT DOCUMENTS

| | | |
|---|---|---|
| JP | H08229100 A | 9/1996 |
| JP | 09-226153 A | 9/1997 |
| JP | 2001-289368 A | 10/2001 |
| JP | 2002143293 A | 5/2002 |
| JP | 2003105211 A | 4/2003 |
| JP | 2004-116557 A | 4/2004 |
| JP | 2005199036 A | 7/2005 |
| JP | 2005318949 A | 11/2005 |
| JP | 2006205396 A | 8/2006 |
| JP | 2008510031 A | 4/2008 |
| WO | 93/15908 A1 | 8/1993 |
| WO | 93/23093 A1 | 11/1993 |
| WO | 9513918 A1 | 5/1995 |
| WO | 2007011541 A | 1/2007 |
| WO | 2010051468 A2 | 5/2010 |

OTHER PUBLICATIONS

"Dryflex (SBS) & (SEBS) Mediprene (SEBS)" VTC TPE Group, Distrupol, 2 pgs. <www.distrupol.com>.

Kim, Sung R., "Surface Modification of Poly(tetrafluoroethylene) Film by Chemical Etching, Plasma, and Ion Beam Treatments," Journal of Applied Polymer Science, vol. 77, 2000 John Wiley & Sons, pp. 1913-1920.

* cited by examiner

MULTILAYER FLEXIBLE TUBING

CROSS-REFERENCE TO RELATED APPLICATIONS

This application claims priority under 35 U.S.C. §120 and is a divisional of U.S. patent application Ser. No. 12/609,829 entitled, MULTILAYER FLEXIBLE TUBING" by Liu et al., filed on Oct. 30, 2009, now U.S. Pat. No. 8,747,978, which claims priority under 35 U.S.C. §119(e) to U.S. Provisional Patent Application No. 61/110,336 entitled "MULTILAYER FLEXIBLE TUBING," Liu et al., filed Oct. 31, 2008. Each patent application cited herein is hereby incorporated by reference in its entirety.

FIELD OF THE DISCLOSURE

This disclosure in general relates to flexible tubing and in particular, to multilayer flexible tubes.

BACKGROUND

Flexible tubing is used in a variety of industries and household products. In particular, flexible tubing is often used in healthcare products, such as catheters and other medical tubing. In addition, flexible tubing is used in household products such as hydration products, including portable water containers. However, conventional tubing for such applications is made using plasticized polyvinyl chloride, which represents environmental and health hazards.

Polyvinyl chloride based products have been used widely in medical fields for healthcare products such as films, gloves, bags, catheters and tubing. In particular, most of the disposable medical devices are produced from plasticized flexible PVC. However, such PVC products are hazardous to both the environment and personal health. Incineration of PVC containing medical waste results in the release of hydrochloric acid and PVC is viewed as a major contributor to HCL in incinerator flue gases. In addition, PVC may also contribute to polychlorinated dibenzodioxin and furan toxins formed during incineration. Levels of these toxins have been found up to three times greater in medical infectious waste compared to municipal waste streams.

In addition to incineration concerns, the problem of elusion of plasticizers into blood, medical solutions or foods when products made of flexible PVC tubing are being used is considered a potential health hazard. To form flexible PVC products, manufacturers typically use plasticizers or processing aids. In particular, exposure to processing aids or plasticizers, such as di-2-ethylhexylphthalate (DEHP), represent a number of health related concerns. In particular, DEHP is suspected of reducing blood platelet efficacy and is suspected of reproductive toxicity, especially to the reproduction system of young males. Since conventional tubing uses a PVC-based flexible composition and such tubing is commonly used to transfer or handle fluids of medicines, foods and beverages, any eluted processing aids or plasticizers can end up in the body of consumers and thus increase their risk of exposure to toxic plasticizers.

Accordingly, flexible tubing that reduces the environmental and health concerns associated with PVC-based flexible compositions would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE DRAWINGS

In a particular embodiment, a flexible tubing includes a layer formed of a blend of propylenic polymer and styrenic block copolymer. In an example, the blend has a loss tangent value (tan δ) at 25° C. of at least 0.1. In addition, the blend may have a Young's modulus not greater than 100 MPa. In a particular example, the blend is free of plasticizers and processing aids. In addition, the flexible tubing may include a liner forming an inner surface of the flexible tubing. The liner may include a polyolefin-based material, which has a flexural modulus not greater than 150 Mpa. When present, the liner forms about 5% to about 20% of the overall tubing thickness and the outer layer forms about 80% to about 95% of the thickness.

In an exemplary embodiment, a flexible tubing may be formed by extrusion. For example, a liner formed of a polyolefin-based material may be co-extruded with an outer layer formed of a blend of propylenic polymer and styrenic block copolymers. The inner layer may directly contact and bind directly to the outer layer without intervening layers or adhesives. Further, the outer layer may be extruded absent plasticizers or other processing aids. The liner may be free of processing aids or plasticizers, or alternatively, the liner may include a fluorocarbon processing aid in an amount not greater than about 1500 ppm.

Figure 1:
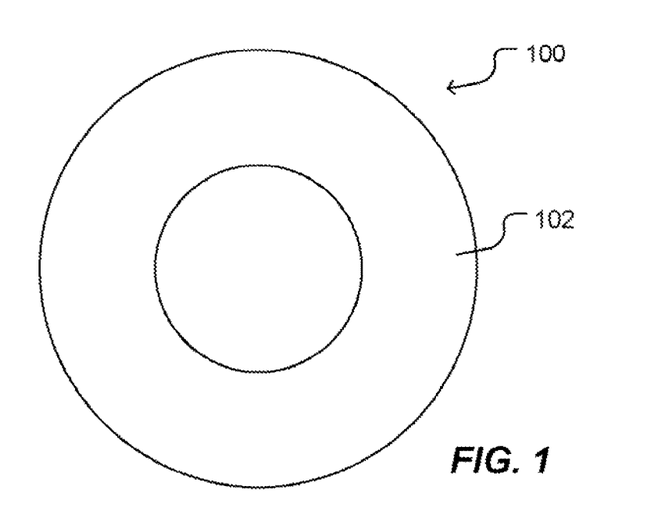
FIG. 1 and FIG. 2 include illustrations of exemplary tubing.

FIG. 1 includes an illustration of a cross-section of an exemplary tubing 100. The tubing 100 includes a layer 102 formed of a flexible polymer blend. In particular, the flexible polymer blend includes a propylenic polymer and a styrenic block copolymer.

In an example, the propylenic polymer is a propylene copolymer or a syndiotactic metallocene polypropylene. The propylene copolymer may be a random copolymer of propylene with a comonomer. An example comonomer includes ethylene, 1-butylene, 1-pentylene, 1-hexylene, 4-methyl-1-pentylene, 2-methylpropylene, 3-methyl-1-pentylene, 5-methyl-1-hexylene, or any combination thereof. In a particular example, the propylene copolymers include not greater than 20 wt % of a comonomer other than propylene. The propylene random copolymer can be produced by a catalyzation technique, such as Ziegler-Natta or metallocene catalyzation. Exemplary random propylene copolymers are available from Basell or Huntsman. Alternatively, the propylenic polymer may be a syndiotactic metallocene polypropylene or a syndiotactic propylene copolymer. For example, syndiotactic propylene copolymer may include a monomer, such as ethylene or an α-olefin, such as those described above. Such syndiotactic metallocene polypropylenes or propylene copolymers are available from Total Petrochemical. In either case, the propylenic polymers have a melt flow index (MFR) of 0.1 to 35 dg/min and a flexural modulus of 130 to 1100 MPA. Melt flow index is determined following ASTM D1238 at a temperature of 230° C. under a load of 2.16 kilograms and the flexural modulus is determined in accordance with ASTM D 790.

The styrenic block copolymer includes a block copolymer having a block of polystyrene. In an example, the styrenic block copolymer includes at least two polystyrene blocks. In a particular example, the styrenic block copolymer includes at least one hydrogenated conjugated diene polymer block. The at least one hydrogenated conjugated diene polymer block is formed from a conjugated diene polymer block that provides a high vinyl content before hydrogenation. For example, a conjugated diene monomer may include 4 to 8 carbon atoms, such as monomers 1,3-butadiene, 2-methyl-1,3-butadiene (isoprene), 2,3-dimethyl-1,3-butadiene, 1,3-pentadiene, 1,3-hexadiene, or any combination thereof. In particular, the conjugated diene monomer may include 1,3-butadiene or isoprene. For example, the conjugated diene monomer may be 1,3-butadiene. In a particular example, the conjugated diene polymer block formed from such conjugated diene monomers has a vinyl content before hydrogenation of at least 50%, such as at least 60%, or even at least 65%. The vinyl content of the conjugated diene blocks is preferably less than 70%.

The styrenic block copolymer also includes styrenic blocks. For example, the styrenic blocks may be formed from one or more monomers, such as styrene, o-methylstyrene, p-methylstyrene, p-tert-butylstyrene, 2,4-dimethylstyrene, α-methylstyrene, vinylnaphthalene, vinyltoluene, vinylxylene, or any combination thereof. In an example, the styrenic block may include styrene, α-methylstyrene or para-methylstyrene. In a particular example, the styrenic block includes styrene.

In a particular embodiment, the styrenic block copolymer may be a hydrogenated styrene-butadiene-styrene block copolymer, a hydrogenated styrene-isoprene-styrene block copolymer, variations thereof, or any combination thereof. In another example, the styrenic block copolymer may be a styrene-ethylene-butylene-styrene block copolymer (SEBS), a styrene-ethylene-propylene-styrene block copolymer (SEPS), a styrene-ethylene-ethylene-butylene-styrene block copolymer (SEEBS), a styrene-ethylene-ethylene-propylene-styrene block copolymer (SEEPS), or any combination thereof. In particular example, the styrenic block copolymer is SEBS. In general, the styrenic block copolymer is a styrenic block copolymer having the properties described below. Exemplary styrenic block copolymers include polymers available from Kraton Polymers of Houston, USA or Kuraray Co. Ltd., of Kurashiki, Japan.

In an example, the styrenic block copolymer has a melt flow index of at least 0.5 dg/min. Melt flow index is determined following ASTM D1238 at a temperature of 230° C. under a load of 2.16 kilograms. For example, the melt flow index of the styrenic block copolymer may be in a range of 1 dg/min to 20 dg/min.

In a further example, the styrenic block copolymer may have a 100% Modulus in the range of 0.2 Mpa to 2.5 Mpa, such as a range of 0.5 Mpa to 2.0 Mpa. The 100% Modulus is determined in accordance with ASTM D638. Further, the styrenic block copolymer may have hardness in a range of 30 Shore A to 80 Shore A, such as a range of 35 Shore A to 70 Shore A.

In an exemplary embodiment, the polymer blend includes the propylenic polymer in an amount in a range of 10% to 80% by weight. The blend also includes the styrenic block copolymer in an amount in a range of 20% to 90% by weight. For example, the blend may include the propylenic polymer in an amount in a range of 20% to 70%, such as a range of 30% to 60% by weight. The blend may include the styrenic block copolymer in an amount in a range of 30% to 80% by weight, such a range of 40%% to 70% by weight. In particular, it is noted that in blends in which the propylenic polymer content is not greater than 80 wt %, the tubing is generally clear or slightly translucent.

In an example, the blend may include fillers, plasticizers, processing aids, UV additives, pigments, anti-oxidants, lubricants, or other additives, or any combination thereof. In a particular embodiment, the blend is free of such additives, particularly, free of processing aids and plasticizers.

For example, the blend may include a UV additive. In an example, the UV additive is selected from an organic UV additive class, such as the benzotriazole class, the triazine class, the hindered amine light stabilizer (HALS) class and the oxanilide class. For example, the UV additive may be a benzotriazole class absorber, such as 2,4-di-tert-butyl-6-(5-chlorobenzotriazol-2-yl) phenol or 2-(2H-benzotriazol-2-yl)-p-cresol. In another example, the UV additive is of the triazine class, such as 2-(4,6-diphenyl-1,3,5-triazin-2-yl)-5-hexyloxy-phenol. In a further exemplary embodiment, the UV additive is a HALS UV additive, such as bis(2,2,6,6,-tetramethyl-4-piperidyl)sebaceate. Other exemplary UV additives are available from CIBA Specialty Chemicals, Inc. under the name Tinuvin® or Chemisorb®, or from Cytec under the tradename Cyasorb®. In an example, the UV additive may be included in the blend in an amount in a range of 0.1 wt % to 1.0 wt %, such as a range of 0.1 wt % to 0.3 wt %. Further, more than one UV additive may be included. In particular, the UV additive may include a blend of benzotriazole UV absorber and HALS, each at level in a range of 0.2 to 0.3 wt %. In a further example, the UV additive is an inorganic additive, such as ceramic additive. For example, the UV additive may include titanium dioxide or zinc oxide.

In an example, the blend exhibits a desirable hardness. For example, the blend exhibits a Shore A hardness in a range of a 40 to 90 Shore A, such as 50 to 85 Shore A, or even 65 to 80 Shore A.

In a further example, the polymer blend has a Young's modulus not greater than 100 Mpa. For example, the blend may have a Young's modulus in a range of 1 to 60 Mpa, such as 3 to 50 Mpa. Further, the blend may have a 100% Modulus in a range of 0.8 Mpa to 15 Mpa, such as a range of 1.0 Mpa to 10 Mpa, or even within a range of 2 Mpa to 8 Mpa. In addition, the blend may have a 300% Modulus in a range of 0.4 to 6 Mpa such as a range of 1 to 5 Mpa or even a range of 1 to 3 Mpa. The 300% Modulus is determined in accordance with ASTM D638. In a further example, the blend may have elongation in a range of 300% to 1500%, such as a range of 500% to 1100%, or even a range of 600% to 1000%. Further, the blend may exhibit a Maximum Stress in a range of 5 Mpa to 25 Mpa, such as a range of 6 Mpa to 20 Mpa, or even a range of 9 to 17 Mpa.

In a further exemplary embodiment, the hose may have more than one layer. For example, FIG. 2 includes an illustration of a flexible tubing 200 including a bulk layer 202 and a liner 204. The inner layer or liner 204 forms an inner surface 206 that defines a lumen 208. In an example, the bulk layer 202 forms an outer surface 210 of the tube 200. In a particular embodiment, the layer 202 and the layer 204 are in direct contact and directly bound to each other at a surface 212, absent intervening layers. The surface 212 may be free of adhesive or other treatment.

Figure 2:
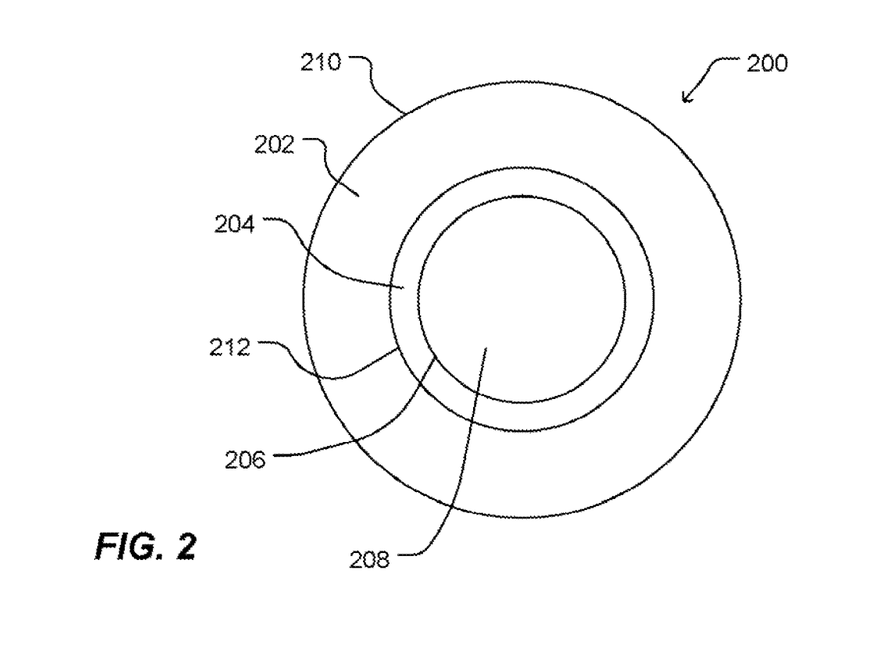

In an example, the layer 202 may be formed of the blend described above with respect to layer 102 of FIG. 1. In a particular example, the blend includes a propylenic polymer, such as a random copolymer or syndiotactic polypropylene. In addition, the blend includes a styrenic block copolymer. For example, the styrenic block copolymer may include at least two styrenic block polymers and at least one hydrogenated conjugated diene polymer block. In a further example, the styrenic block copolymer may include SEBS, SEPS, SEEBS, SEEPS, or any combination thereof. In particular, the blend may have a Young's modulus not greater than 100 Mpa or may have a loss tangent value (tan δ) at 25° C. of at least 0.1.

The liner 204 may be formed of a polyolefin material, such as a polypropylene-based or polyethylene-based elastomer or plastomer. For example, the elastomer or plastomer may be formed of a metallocene polymerization product. In particular, the elastomer or plastomer has low extractables and has good organoleptic properties. Alternatively, the polyolefin material may be formed through a technique other than metallocene catalyzation.

In particular, the layer 204 has a flexural modulus not greater than 150 Mpa. For example, the flexural modulus may be not greater than 120 Mpa, such as a range of 5 Mpa to 110 Mpa, or even 10 Mpa to 110 Mpa. The flexural modulus is determined in accordance with ASTM D 790.

The polyolefin material may have hardness in a range of 40 Shore A to 50 Shore D. For example, the hardness may be within a range of 60 Shore A to 95 Shore A, such as a range of 80 Shore A to 95 Shore A. Further, the polyolefin material may have a melt flow index in a range of 1 dg/min to 30 dg/min, such as a range of 5 dg/min to 25 dg/min, or even a range of 5 dg/min to 10 dg/min. The melt flow index is measured in accordance with the method described above. Exemplary polyolefin materials are available under the trade names Affinity™, Infuse™, Versify™, Flexomer™, Nordel™ and Engage™ supplied by Dow Chemicals; Exact™ and Vistamaxx™ available from Exxon Mobil Chemicals; and Notio™ available from Mitsui Chemicals.

In an additional example, the liner 204 may include an antimicrobial additive. For example, the antimicrobial additive may be a silver-based antimicrobial additive, such as an antimicrobial additive available from Milliken under the tradename AlphaSan®. The antimicrobial additive may be included in an amount in a range of 0.1 wt % to 5 wt %, such as a range of 0.5 wt % to 3 wt %, or even a range of 0.5 wt % to 2 wt %. Alternatively, particularly in embodiments absent a liner 204 in which the blend of propylenic polymer and styrenic block copolymer contacts fluid, the antimicrobial additive may be included in the blend in the amounts described above.

In an example, the liner 204 forms about 5% to about 20% of the overall thickness of the tube and the outer layer forms between 80% and 90% of the thickness of the tube. For example, the liner 204 may form between 5% and 15% of the thickness, such as between 5% and 10% of the thickness, or even between 6% and 10% of the thickness. The outer layer 202 may form between 85% and 95% of the thickness, such as between 90% and 95% of the thickness. In an example, the total thickness of the hose is not greater than 250 mil, such as not greater than 200 mil, or even not greater than 150 mil. Further, the total thickness of the hose may be at least 20 mil, such as at least 50 mil, or even at least 100 mil. The thickness of the liner 204 may be between 1 mil and 20 mil, such as between 3 mil and 15 mil, or even between 5 mil and 10 mil. The outer thickness may be in a range of 20 mil to 250 mil, such as a range of 50 mil to 200 mil, a range of 100 mil to 200 mil, or even a range of 100 mil to 150 mil.

Particular embodiments of the monolayer or multilayer tube exhibit desirable fitting retention, kink resistance, clarity, mechanical dampening, glass transition temperature, and storage modulus. To determine fitting retention, tubing constructions are formed using tubing samples and one of four types of barbed or tapered connectors, including a 2-barb connector, a 3-barb connector, a Type-1 4-barb connector and a Type-2 4-barb connector of plastic construction for ¼" ID tubing. The tubing is manually pushed onto the fittings and tested in an Instron tensile tester for the force that separates the tubing from the connector at one of two temperatures, room temperature or 65° C. The force resulting in the disconnection of the tubing from the fitting represents the fitting retention force. In an example, the fitting retention force at 25° C. is at least 15 $lb_f$, such as at least 20 $lb_f$, or even at least 25 $lb_f$. In a further example, the fitting retention force at 65° C. is at least 5 $lb_f$, such as at least 10 $lb_f$, or even at least 15 $lb_f$.

Kink resistance is determined by measuring the minimum bending radius (MBR) of the tubing before kinking. A tube is held at its two ends and tied in loops. The radius of the smallest loop the tube can be tied without kinking is the MBR of the tubing. Smaller MBR implies greater kink resistance. In an example, the tubing exhibits an MBR not greater than 1 in, such as not greater than 0.9 in or even not greater than 0.85 in.

Clarity of the tubing is checked visually and classified into four levels in terms of transparency: clear, translucent, hazy, and opaque. In particular embodiments, the tubing is not opaque and may be clear or translucent. Preferably, the tubing is clear.

Dynamic mechanical analysis (DMA) is performed to determine the glass transition temperature, the mechanical dampening, and storage (elastic) modulus of the blends used in forming the tubes. Mechanical dampening is represented by the lost tangent value (tan δ) at 1 Hz given during the DMA test. Embodiments of the polymer blend used in the tubing exhibit a single glass transition peak, indicating miscibility and compatibility of the components of the blend. In particular, the polymer blend has a glass transition temperature in a range of −20° C. to 15° C. The loss tangent value (tan δ) at 25° C. of the blend used in the tube, representative of mechanical dampening, is at least about 0.1. For example, tan δ may be at least about 0.30, or even at least 0.4. In a further example, the blend may exhibit a storage modulus at 90° C. of at least 5 Mpa, such as at least 7 Mpa, at least 8 Mpa, or even at least 9 Mpa. The blend may exhibit hardness in a range of 40 Shore A to 90 Shore A, such as a range of 50 Shore A to 85 Shore A, a range of 60 Shore A to 80 Shore A, or even a range of 65 Shore A to 75 Shore A.

In an exemplary method, a monolayer tube may be formed by extruding a polymer blend including propylenic polymer and styrenic block copolymer. In another exemplary method, a multilayer tube may be formed by extruding more than one layer, at least one of which includes the blend of propylenic polymer and styrenic block copolymer.

In particular, to form a monolayer tube, pellets of propylenic polymer and pellets of styrenic block copolymer may be compounded through a corotating intermeshing twin-screw extruder, cooled by a water bath, and cut into compound pellets. The resulting pellets of the blend are fed into an extruder with tubing die, such as a single screw extruder. In a particular example, a 3-zone screw is used. Alternatively, with miscible blends, the compounding steps can be avoided and the pellets of the individual components dry mixed for extrusion into the tube.

For a multilayer tube, the layers may be coextruded. Extruders are connected to a multilayer tubing die. The blend is fed to a first extruder and the polyolefin material is fed to a second extruder. The blend includes a propylenic polymer and styrenic block copolymer. The propylenic polymer has a melt flow index in a range of 0.1 dg/min to 35 dg/min. The styrenic block copolymer has a melt flow index of at least 0.5 dg/min. In a particular example, the blend is free of additives and in particular, is free of processing aids and plasticizers.

In an embodiment, the polyolefin material has a flexural modulus not greater than 150 Mpa. The polyolefin material may have a melt flow index in a range of 1 dg/min to 30 dg/min. In an example, the polyolefin material may be free of additive, such as plasticizer or processing aids. Alternatively, the polyolefin may include not greater than 1500 ppm of a processing aid, such as a fluorocarbon processing aid. In an example, a fluorocarbon processing aid may be added in an amount in a range of 500 ppm to 1000 ppm.

Particular embodiments of the flexible tubes provide technical advantages over prior tubing structures. For example, embodiments of the present flexible tubes provide a combination of desirable features, such as mechanical damping, hardness, single glass transition temperature, clarity, or minimum bending radius, while being free of additive that may elute into process streams and optionally, being free of species that may produce hazardous byproducts during incineration.

In exemplary embodiments, the flexible material disclosed above in relation to a tube can be used in a variety of applications. For example, the flexible material may be used in applications such as hydration tubing for sports and entertainment equipment, fluid transfer tubing in food and beverage processing equipment, fluid transfer tubing in medical and health care, biopharmaceutical manufacturing equipment, and peristaltic pump tubing for medical, lab and biopharmaceutical applications. In a particular embodiment, a fluid source, such as a container, reactor, reservoir, tank, or bag, is coupled to a flexible tube, such as the flexible tube illustrated in FIG. 1 or FIG. 2. The flexible tube may engage a pump, fitting, valve, dispenser, or another container, reactor, reservoir, tank, or bag. In an example, the tube may be coupled to a water container and may have a dispenser fitting on the distal end. In another example, the tube may be coupled to a fluid bag and coupled to a valve at the distal end. In a further example, the tube may be coupled to a container, be engaged in a pump, and be coupled to a second container at a distal end. Further, monolayer or multilayer tubing made from blends of rPP/styrenic block copolymers may be used as peristaltic pumping tube.

EXAMPLES

Example 1

Samples of polymer blends are prepared from a propylenic polymer and a styrenic block copolymer. The propylenic polymer is selected from a random propylene copolymer or a syndiotactic polypropylene. The propylene random copolymer has a melt flow index of 25 dg/min and a flexural modulus of 900 MPa. The propylene random copolymer is available from Huntsman. The syndiotactic polypropylene, available from Total Petrochemical, has a melt flow index of 12 dg/min and a flexural modulus of 377 MPa. The styrenic block copolymer is a SEBS copolymer available from Kraton Polymer, Houston, USA and has a melt flow index of 18 dg/min, a hardness of 50 Shore A, and a 100% Modulus of 1.5 MPa.

TABLE 1

Blends of Propylenic Polymers with SEBS Copolymer

| | PP, % | Shore A Hardness | Young's Modulus, MPA | E-100%, MPA | E-300%, MPa | ε, % | Max Stress, MPa | Clarity |
|---|---|---|---|---|---|---|---|---|
| Propylene | 0 | 58 | 3.7 | 1.5 | 1.0 | 640 | 6.30 | Clear |
| Random | 20 | 60 | 6.5 | 2.0 | 1.3 | 947 | 13.1 | Clear |
| Copolymer | 30 | 66 | 9.3 | 2.6 | 1.9 | 805 | 12.8 | Clear |
| | 40 | 71 | 14.2 | 3.6 | 2.5 | 607 | 11.2 | Clear |
| | 50 | 81 | 35.5 | 6.1 | 3.3 | 479 | 11.0 | Clear |
| | 60 | 90 | 115.9 | 8.9 | 4.2 | 424 | 13.9 | Trans |
| | 80 | 95 | 247.5 | 13.2 | 5.1 | 342 | 16.9 | Trans |
| Syndiotactic | 0 | 58 | 3.7 | 1.5 | 1.0 | 640 | 6.3 | Clear |
| Polypropylene | 10 | 57 | 4.6 | 1.6 | 1.0 | 1100 | 14.5 | Clear |
| | 20 | 61 | 7.6 | 2.2 | 1.4 | 1052 | 14.2 | Clear |
| | 30 | 71 | 11.5 | 3.1 | 2.1 | 906 | 15.4 | Clear |
| | 40 | 77 | 17.4 | 4.2 | 2.5 | 900 | 18.6 | Clear |
| | 50 | 85 | 83.0 | 6.9 | 3.5 | 750 | 20.0 | Clear |
| | 60 | 92 | 109.0 | 8.2 | 4.1 | 620 | 19.0 | Clear |
| | 80 | 94 | 207.0 | 11.3 | 5.0 | 450 | 20.0 | Clear |

Each of the samples exhibits a desirable clarity, particularly those blends having less than 60 wt % propylenic polymer. In addition, blends having propylenic polymer in a range of 20 wt % to 65 wt % exhibit desirable properties, such as hardness and Young's modulus.

Example 2

Samples of polymer blends are prepared from a propylenic polymer and a styrenic block copolymer. The propylenic polymer is selected from a random propylene copolymer or a syndiotactic polypropylene. The propylene random copolymer, available from Huntsman, has a melt flow index of 25 dg/min and a flexural modulus of 900 MPa. The syndiotactic polypropylene, available from Total Petrochemical, has a melt flow index of 12 dg/min and a flexural modulus of 377 MPa. The styrenic block copolymer is a SEPS copolymer available from Kuraray Co. Ltd, Kurashiki, JP under the tradename Hybrar and has a melt flow index of 4 dg/min, a hardness of 64 Shore A, and a 100% Modulus of 1.7 MPa.

TABLE 2

Blends of Propylenic Polymer and SEPS copolymer

|  | PP, % | Shore A Hardness | Young's Modulus, MPA | E-100%, MPA | E-300%, MPa | ε, % | Max Stress, MPa | Clarity |
|---|---|---|---|---|---|---|---|---|
| Propylene | 0 | 52 | 5.5 | 1.6 | 1.0 | 1033 | 9.9 | Clear |
| Random | 20 | 68 | 10.4 | 2.4 | 1.4 | 1186 | 17.3 | Clear |
| Copolymer | 40 | 85 | 27.9 | 4.7 | 2.5 | 1085 | 21.7 | Clear |
|  | 50 | 89 | 63.6 | 7.0 | 3.7 | 700 | 21.0 | Clear |
|  | 60 | 93 | 127.3 | 8.9 | 4.4 | 650 | 23.0 | Trans |
|  | 80 | 94 | 191.7 | 12.2 | 4.9 | 500 | 22.0 | Trans |
| Syndiotactic | 0 | 52 | 5.5 | 1.6 | 1.0 | 1033 | 9.9 | Clear |
| Polypropylene | 20 | 65 | 8.3 | 2.1 | 1.2 | 1257 | 18.8 | Clear |
|  | 40 | 80 | 27.6 | 4.6 | 2.5 | 1000 | 20.0 | Clear |
|  | 50 | 89 | 60.8 | 6.1 | 3.2 | 850 | 20.5 | Clear |
|  | 60 | 90 | 95.5 | 7.6 | 3.9 | 650 | 22.0 | Clear |
|  | 80 | 93 | 182.1 | 10.1 | 4.5 | 500 | 20.6 | Clear |

Each of the samples exhibits a desirable clarity, particularly those blends having less than 60 wt % propylenic polymer. In addition, blends having propylenic polymer in a range of 20 wt % to 65 wt % exhibit desirable properties, such as hardness and Young's modulus.

Example 3

Samples of polymer blends are prepared from a propylenic polymer and a styrenic block copolymer. The propylenic polymer is selected from a random propylene copolymer or a syndiotactic polypropylene. The propylene random copolymer, available from Huntsman, has a melt flow index of 25 dg/min and a flexural modulus of 900 MPa. The syndiotactic polypropylene, available from Total Petrochemical, has a melt flow index of 12 dg/min and a flexural modulus of 377 MPa. The styrenic block copolymer is a SEEPS copolymer available from Kuraray Co. Ltd, Kurashiki, JP under the tradename Hybrar and has a melt flow index of 2 dg/min, a hardness of 41 Shore A, and a 100% Modulus of 0.6 MPa.

TABLE 3

Blends of Propylenic Polymer and SEEPS copolymer.

|  | PP, % | Shore A Hardness | Young's Modulus, MPA | E-100%, MPA | E-300%, MPa | ε, % | Max Stress, MPa | Clarity |
|---|---|---|---|---|---|---|---|---|
| Propylene | 0 | 42 | 1.5 | 0.8 | 0.4 | 1408 | 9.0 | Clear |
| Random | 20 | 62 | 7.1 | 1.9 | 1.0 | 1256 | 11.7 | Clear |
| Copolymer | 40 | 73 | 24.5 | 3.8 | 2.1 | 1079 | 17.1 | Clear |
|  | 50 | 89 | 51.9 | 6.5 | 3.1 | 747 | 17.4 | Clear |
|  | 60 | 92 | 96.4 | 8.5 | 4.0 | 610 | 19.3 | Clear |
|  | 80 | 93 | 221.0 | 11.9 | 4.7 | 489 | 19.6 | Trans |
| Syndiotactic | 0 | 42 | 1.5 | 0.8 | 0.4 | 1408 | 9.0 | Clear |
| Polypropylene | 20 | 61 | 7.6 | 2.1 | 1.1 | 1250 | 11.6 | Clear |
|  | 40 | 80 | 20.9 | 3.9 | 2.0 | 1204 | 17.7 | Clear |
|  | 50 | 85 | 42.0 | 5.6 | 2.8 | 840 | 18.0 | Clear |
|  | 60 | 90 | 76.0 | 7.0 | 3.5 | 720 | 22.0 | Clear |
|  | 80 | 93 | 191.5 | 10.7 | 4.7 | 550 | 21.0 | Clear |

Each of the samples exhibits a desirable clarity, particularly those blends having less than 60 wt % propylenic polymer. In addition, blends having propylenic polymer in a range of 20 wt % to 65 wt % exhibit desirable properties, such as hardness and Young's modulus.

Example 4

Monolayer tube samples are prepared from a blend of propylenic polymer and styrenic block copolymer. The blends include propylenic polymer and styrenic block copolymer in a ratio of 70/30 to 50/50 PP/styrenic block copolymers and have a hardness of approximately 70 Shore A. For example, the propylenic polymer has a melt flow index of 25 dg/min and a flexural modulus of 900 MPa and is available from Huntsman. The styrenic block copolymer has a melt flow index of 18 dg/min, a hardness of 52 Shore A, and a 100% modulus of 1.5 MPa. The styrenic block copolymer is available from Kraton of Houston, Tex. The blend is compounded through a corotating intermeshing twin-screw extruder, cooled by a water bath, and cut into pellets. The resulting pellets are fed into a single screw extruder, equipped with a tubing die. A regular 3-zone screw is used. The temperature profile is set at 275° F., 360° F. and 390° F. for the three segments of the extruder. The adapter and die temperatures are set at 380° F. and 350° F., respectively. The polymer melt flowing out of the die is discharged into a submerging water tank for cooling, where the extrudate is frozen into a tubing shape. Internal air pressure, screw speed and pulling rate are combined to control the tubing dimensions and wall thickness. Transparent and flexible tubing with dimensions of ¼" for ID and ⅜" for OD is obtained through the above compounding and extrusion procedures.

Due to the high chemical miscibility between the propylenic polymer and the styrenic block copolymers, the twin-screw compounding process may be omitted, which can lead to significant cost saving in making tubing products out of the blends. A similar blend is formed using a process without twin-screw compounding. The resins are mixed in a tumbling drum for 20 minutes. The mixtures are fed into a single screw extruder for extrusion of tubing. A square-pitch, single-flight screw, with a reverse flow mixing element at the end, is used to enhance mixing effects in the melt of the blend. The resulting tubing via this dry-blending and extrusion process shows same level of transparency as the compounded blend. Furthermore, as illustrated in Table 4, the tensile mechanical properties of the tubings made from these two different processes are not significantly different. The breaking strength, modulus at 100, 200, 300 and 400% elongation and breaking elongation are similar.

TABLE 4

Properties of Compounded and Dry Blended Samples.

|  | 100% Modulus, psi | 200% Modulus, psi | 300% Modulus, psi | 400% Modulus, psi | Tensile Strength, psi | Tensile Elongation, % |
|---|---|---|---|---|---|---|
| Compounded | 331 ± 42 | 261 ± 38 | 254 ± 41 | 240 ± 41 | 1836 ± 120 | 723 ± 90 |
| Dry Blended | 423 ± 100 | 270 ± 48 | 227 ± 37 | 215 ± 39 | 2012 ± 243 | 798 ± 180 |

Example 5

Two layer tubing is formed by coextruding two layers. One layer includes a blend of propylenic polymer and styrenic block copolymer and a second layer includes polyolefin material.

To make the two-layer tubing, two single screw extruders were connected to a Genca 2-layer tubing die. A twin-screw compounded blend of propylenic polymer and styrenic block copolymers is fed into one extruder and polyolefin resin is fed into another extruder. Thickness of the liner and jacket layers is controlled by adjusting the screw speeds and pulling rate. Two-layer tubing with the formulation of EXAMPLE 4 being the jacket material is extruded. A polyolefin material is coextruded as the liner material. Typical temperature profiles and running conditions are given in Table 5. Smooth and transparent two-layer tubing of ¼"×⅜" with a liner of 8 mil are prepared at line speed lower than 20 ft/min. Severe melt fracture is observed when particular liner materials are extruded at speeds higher than 20 ft/min, resulting in shark-skin like appearance on the liner surface. Adding 500-1000 ppm fluorocarbon based processing aid into the liner resin is found to solve the shark-skin problem completely even if coextrusion is run at speeds higher than 20 ft/min.

TABLE 5

Extruder Temperatures

| Extruder | Screw Speed, rpm | Die Temp, ° F. | Adapter Temp, ° F. | Clamp Temp, ° F. | Zone 3 Temp, ° F. | Zone 2 Temp, ° F. | Zone 1 Temp, ° F. |
|---|---|---|---|---|---|---|---|
| Inner layer | 20 | 350 | 345 | 385 | 390 | 360 | 275 |
| Jacket layer | 60 | — | — | 385 | 390 | 360 | 275 |

Example 6

In accordance with Example 4, monolayer tubing is formed from several blends. In accordance with Example 5, two-layer tubing is formed from several blends and polyolefin materials. These samples are compared to samples of PVC flexible tubing with a thermoplastic polyurethane liner (PVC/TPU), Tygon 2001, Tygon 2075, Tygoprene XL-60, a TPU-2% Blue tubing (Estane 58070), SEBS 2645 (a tube formed of Evoprene G 291-75), and C-Flex R70-374. PVC/TPU tubing, Tygon 2001, Tygon 2075, Tygonprene XL-60 and C-Flex R70-374 are commercially available tubing products of Saint-Gobain Performance Plastics. TPU-2% Blue and SEBS 2645 tubes are made of commercially available resin or compound.

Sample 1 is a monolayer tube formed of a blend of a propylenic polymer and a polyolefin material. The propylenic polymer includes a syndiotactic polypropylene available from Total Petrochemical, having a melt flow index of 12 dg/min and a flexural modulus of 377 MPa. In addition, the blend includes a polyolefin material available from Exxon Mobil Chemicals that has a melt flow index of 3 dg/min and a flexural modulus of 11.4 MPa. The blend includes 90 wt % of the polyolefin resin and 10 wt % of the syndiotactic polypropylene.

Sample 2 is a monolayer tube formed of a blend of a propylenic polymer and a polyolefin material. The propylenic polymer includes a propylene random copolymer available from Huntsman, having a melt flow index of 25 dg/min and a flexural modulus of 900 MPa. In addition, the blend includes a polyolefin material available from Exxon Mobil Chemicals that has a melt flow index of 3 dg/min and a flexural modulus of 11.4 MPa. The blend includes 90 wt % of the polyolefin resin and 10 wt % of the propylene random copolymer.

Sample 3 is a monolayer tube formed of a blend of propylenic polymer and styrenic block copolymer. The propylenic polymer includes a propylene random copolymer available from Huntsman, having a melt flow index of 25 dg/min and a flexural modulus of 900 MPa. In addition, the blend includes a SEBS styrenic block copolymer available from Kraton that has a melt flow index of 18 dg/min, a hardness of 52 Shore A, and a flexural modulus of 1.5 MPa. The blend includes 70 wt % of the styrenic block copolymer and 30 wt % of the propylenic polymer and is free of processing aids and plasticizers.

Sample 4 is a monolayer tube formed of a blend of propylenic polymer and styrenic block copolymer. The propylenic polymer includes a propylene random copolymer available from Huntsman, having a melt flow index of 25 dg/min and a flexural modulus of 900 MPa. In addition, the blend includes a SEBS styrenic block copolymer available from Kraton that has a melt flow index of 18 dg/min, a hardness of 52 Shore A, and a flexural modulus of 1.5 MPa. The blend includes 60 wt % of the styrenic block copolymer and 40 wt % of the propylenic polymer and is free of processing aids and plasticizers.

Sample 5 is a monolayer tube formed of a blend of propylenic polymer and styrenic block copolymer. The propylenic polymer includes a propylene random copolymer available from Huntsman, having a melt flow index of 25 dg/min and a flexural modulus of 900 MPa. In addition, the blend includes a SEPS styrenic block copolymer available from Kraton that has a melt flow index of 4 dg/min, a hardness of 64 Shore A, and a flexural modulus of 1.7 MPa. The blend includes 70 wt % of the styrenic block copolymer and 30 wt % of the propylenic polymer and is free of processing aids and plasticizers.

Sample 6 is a monolayer tube formed of a blend of propylenic polymer and styrenic block copolymer. The propylenic polymer includes a propylene random copolymer available from Huntsman, having a melt flow index of 25 dg/min and a flexural modulus of 900 MPa. In addition, the blend includes a SEEPS styrenic block copolymer available from Kraton that has a melt flow index of 2 dg/min, a hardness of 41 Shore A, and a flexural modulus of 0.6 MPa. The blend includes 70 wt % of the styrenic block copolymer and 30 wt % of the propylenic polymer and is free of processing aids and plasticizers.

Sample 7 is a two layer tube including the blend of Sample 3 as a jacket layer and a polyolefin material as an inner liner. The polyolefin material is a polypropylene material available from Basell, having a melt flow index of 6 dg/min and a flexural modulus of 130 MPa.

Sample 8 is a two layer tube including the blend of Sample 3 as a jacket layer and a polyolefin material as an inner liner. The polyolefin material is available from DOW Chemical under the tradename Affinity™ and has a melt flow index of 3 dg/min and a flexural modulus of 108 MPa.

Sample 9 is a two layer tube including the blend of Sample 5 as a jacket layer and a polyolefin material as an inner liner. The polyolefin material is a polypropylene-based metallocene material having a melt flow index of 25 dg/min and a flexural modulus of 110 MPa.

Sample 10 is a two layer tube including the blend of Sample 6 as a jacket layer and a polyolefin material as an inner liner. The polyolefin material is a polypropylene-based metallocene material having a melt flow index of 25 dg/min and a flexural modulus of 110 MPa.

Samples 7, 8, 9, and 10 are formed in accordance with the method disclosed in Example 5. Samples 1-6 are formed using the method disclosed in relation to Example 4.

To evaluate the performance of the monolayer and two-layer tubing, the following tests are conducted on the tubing samples: fitting retention at room temperature and 65° C., kink resistance, clarity, mechanical dampening at room temperature, glass transition temperature, and storage modulus at elevated temperatures. In the fitting retention test, retention force is tested for each tube on four types of barbed and tapered connectors, including a 2-barb connector, a 3-barb connector, a Type-1 4-barb connector and a Type-2 4-barb connector of plastic construction for ¼" ID tubing. In particular, the 2-barbed fitting has a length of the barbed portion of 0.645", inner diameter of 0.175", and outer diameter (largest diameter of the barbed part) of 0.335". The 3-barbed fitting has a length of the barbed portion of 0.770", an inner diameter of 0.175", and an outer diameter (largest diameter of the barbed part) of 0.310". The 4-barbed Type 1 fitting has a length of the barbed part of 1.350", an inner diameter of 0.190", and an outer diameter (largest diameter of the barbed part) of 0.355". The 4-barbed Type 2 fitting has a length of the barbed part of 0.950", an inner diameter of 0.175", and an outer diameter (largest diameter of the barbed part) of 0.355". Tubing samples are pushed onto the fittings manually and tested in an Instron tensile tester for the maximum fitting retention force prior to separate the tubing from the connector. The force is recorded in pound force ($lb_f$) and used as an indictor of the fitting retention capability of the flexible tubing. The fitting retention force is tested for tubing at both room temperature and 65° C. As illustrated in Table 6, most of Samples 1-10 exhibit a fitting retention force of at least 25 $lb_f$ at room temperature and particular samples exhibit a fitting retention force of at least 15 $lb_f$ at 65° C.

TABLE 6

Retention Force for Samples

| Sample Information | | Fitting Retention Force at 25° C. with different connectors | | | | Fitting Retention Force at 65° C. with different connectors | | | |
| --- | --- | --- | --- | --- | --- | --- | --- | --- | --- |
| Category | Tubing | 3-barbed | 2-barbed | 4-barbed Type1 | 4-barbed Type 2 | 3-barbed | 2-barbed | 4-barbed Type1 | 4-barbed Type 2 |
| Monolayer Tubing | PVC/TPU | 24.0 | 33.4 | 82.1 | 65.8 | 11.6 | 17.3 | 47.6 | 28.6 |
| | Tygon 2001 | 11.4 | 15.0 | 49.4 | 30.4 | — | — | — | — |
| | Tygon 2075 | 12.9 | 8.8 | 20.3 | 16.9 | 2.2 | 1.7 | 5.7 | 6.6 |
| | Tygoprene XL-60 | 14.6 | 19.2 | 35.3 | 27.2 | — | — | — | — |
| | TPU -2% Blue | 23.5 | 35.2 | 61.2 | 51.5 | 11.5 | 15.3 | 37.4 | 25.6 |
| | SEBS 2645 | 25.9 | 25.7 | 42.7 | 38.3 | 11.2 | 13.7 | 24.1 | 29.6 |
| | C-Flex R70-374 | 17.4 | 16.0 | 29.0 | 23.5 | — | — | — | — |
| | Sample 1 | 28.7 | 28.1 | 50.6 | 32.2 | — | — | — | — |
| | Sample 2 | 23.6 | 31.0 | 48.1 | 36.6 | 4.5 | 4.2 | 6.5 | 5.1 |
| | Sample 3 | 42.1 | 43.8 | 55.7 | 48.7 | 20.9 | 14.7 | 20.7 | 18.2 |
| | Sample 4 | 40.5 | 38.0 | 68.9 | 60.3 | 27.1 | 18.7 | 25.8 | 24.6 |
| | Sample 5 | 33.9 | 42.1 | 52.1 | 44.0 | 17.2 | 15.6 | 16.8 | 16.4 |
| | Sample 6 | 32.1 | 40.5 | 47.8 | 39.5 | 15.5 | 13.0 | 15.7 | 16.0 |
| Two-layer Tubing | Sample 7 | 27.5 | 31.6 | 45.5 | 40.4 | 19.4 | 21.7 | 24.7 | 17.1 |
| | Sample 8 | 29.2 | 30.8 | 45.2 | 33.6 | 20.6 | 18.5 | 20.5 | 19.5 |
| | Sample 9 | 27.8 | 38.6 | 48.4 | 44.1 | 16.9 | 12.2 | 18.4 | 15.2 |
| | Sample 10 | 17.4 | 30.3 | 47.7 | 45.2 | 16.1 | 13.7 | 15.3 | 16.7 |

The kink resistance is evaluated by measuring the minimum bending radius (MBR) of the tubing before kinking A tube is held at its two ends and tied in loops. The radius of the smallest loop the tube can tie without kinking is the MBR of the tubing. Smaller MBR implies greater kink-resistance. Clarity of the tubing is checked visually and classified into four clarity levels: clear, translucent, hazy and opaque. A dynamic mechanical analysis (DMA) test is used to determine the glass transition temperature, mechanical dampening and storage (elastic) modulus of tubing. Specifically, the mechanical dampening capability of a tube is related to the loss tangent value given by the DMA test. The storage modulus of the tubing material suggests how stiff and elastic the tube is at a given measuring temperature.

Table 7 illustrates the values of other properties, including hardness, clarity, kink resistance, dampening capability and glass transition temperature. The hardness of each sample and the comparative samples is in a range of 60 Shore A to 80 Shore A, with many samples having a hardness of approximately 70 Shore A. The tubes are clear and transparent, except for the SEBS 2645 tube and Samples 1 and 2. Most of the tubes have a similar kink resistance as the flexible PVC/TPU tubing. In particular, the MBR is less than 1.0 inches.

Regarding dampening capability at room temperature, flexible PVC tubing has a loss tangent value of 0.41. Each of the Samples 1-10 exhibit a loss tangent value (tan δ) of greater than 0.1. In particular, Samples 5 and 9 exhibit a loss tangent value of not less than 0.4. Other Samples have a loss tangent value in the range of 0.15-0.2, which is not as good as flexible PVC in dampening, but better than other commercially available flexible tubing.

The glass transition temperatures of the Samples 1-10 are in the range of −20° C. to 15° C. The glass transition temperatures of the Samples 1-10 are not as low as those of the polyolefin-based materials, but are lower than flexible PVC, which indicates sufficient low-temperature impact resistance and mechanical performance of the tubing.

TABLE 7

Properties of Samples.

| Category | Tubing | Hardness Shore A | Clarity | MBR, in | Tanδ - 25° C. | Storage Modulus @ 90° C., MPa | Tg, ° C. |
|---|---|---|---|---|---|---|---|
| Monolayer Tubing | PVC/TPU | 68.0 | Clear | 0.81 | 0.41 | 3.9 | 18.9 |
| | Tygon 2001 | 70.0 | Clear | 1.14 | 0.091 | 5.9 | −21 |
| | Tygon 2075 | 72.0 | Clear | 0.73 | 0.05 | 1.7 | −29 |
| | Tygoprene XL-60 | 60.0 | Clear | 0.92 | 0.094 | 5.5 | −50 |
| | TPU -2% Blue | 72.0 | Clear | 0.89 | 0.072 | 9.3 | −34 |
| | SEBS 2645 | 80.0 | Opaque | 0.98 | 0.088 | 16.8 | −50 |
| | C-Flex R70-374 | 60.0 | Clear | 0.8 | 0.11 | 5.1 | <−50 |
| | Sample 1 | 75.0 | Hazed | 0.83 | 0.1 | 7.3 | −14.7 |
| | Sample 2 | 76.0 | Hazed | 0.89 | 0.098 | 9.4 | −12.8 |
| | Sample 3 | 70.0 | Clear | 0.88 | 0.18 | 9.7 | −16.6 |
| | Sample 4 | 75.0 | Clear | 1.32 | 0.144 | 29.4 | −17.8 |
| | Sample 5 | 70.0 | Clear | 0.77 | 0.44 | 8.9 | 13.98 |
| | Sample 6 | 70.0 | Clear | 0.85 | 0.18 | 8.6 | −7.15 |
| Two-layer Tubing | Sample 7 | 70.0 | Clear | 0.80 | 0.13 | 9.8 | 20.54 |
| | Sample 8 | 70.0 | Clear | 0.84 | 0.135 | 9.7 | 20.45 |
| | Sample 9 | 70.0 | Clear | 0.79 | 0.4 | 9.0 | 12.1 |
| | Sample 10 | 70.0 | Clear | 0.83 | 0.18 | 8.7 | −10 |

Example 7

To test UV-stability of polymer materials for out-door uses, molded plaques are placed in a QUV tester equipped with UVA-340 lamps and exposure to UV radiation at intensified irradiance of 1.14 w/m$^2$/nm at 340 nm for up to 1000 hrs. Mechanical properties and yellow index of the material before and after UV exposure are tested and compared. For materials that are suitable for out-door uses, the mechanical properties, which include tensile strength, elongation, modulus at 100% strain and modulus at 300% strain, should not change by more than 25%, while changes in yellow index of the material should not exceed 20%.

TABLE 8

Testing results of UV-Stabilized PP/Styrenic block copolymer blends

| | UV-Stabilized Blend Formulations | | | | | |
|---|---|---|---|---|---|---|
| Raw Materials | 341-36-4 | 341-38-2 | 341-38-3 | 341-38-4 | 341-52-1 | 314-52-2 |
| SEPS | 70 | 70 | 70 | 70 | 70 | 70 |
| r-PP | 30 | 30 | 30 | 30 | 30 | 30 |
| Tinuvin 326 | | 0.2 | | | 0.2 | 0.3 |
| Tinuvin 783 | | | | | 0.2 | 0.3 |
| Tinuvin 791 | 0.2 | | | | | |
| Cyasorb THT 4801 | | | 0.3 | | | |
| Cyasorb THT 4611 | | | | 0.3 | | |

TABLE 8-continued

Testing results of UV-Stabilized PP/Styrenic block copolymer blends

| Raw Materials | UV-Stabilized Blend Formulations | | | | | |
|---|---|---|---|---|---|---|
| | 341-36-4 | 341-38-2 | 341-38-3 | 341-38-4 | 341-52-1 | 314-52-2 |
| GICS-8948 blue | 3 | 3 | 3 | 3 | 3 | 3 |
| Physical Properties | Percent Change After 1000 hr QUV Exposure | | | | | |
| Tensile Strength | −59.1% | −21.7% | −70.4% | −49.7% | −6.7% | −17.8% |
| Elong. % | −28.2% | −5.7% | −50.2% | −27.7% | −0.5% | −5.5% |
| 100% modulus | −14.0% | 6.7% | −2.7% | −1.1% | 6.1% | 2.8% |
| 300% modulus | −21.3% | −2.1% | −15.5% | −10.1% | 0.4% | −3.7% |
| Yellow Index | −53.1% | −4.3% | −16.7% | −16.1% | −15.8% | −2.3% |

Table 8 illustrates various UV additives in a blend of rPP and styrenic block copolymer, which is also pigmented into a blue color. Without adding UV additives, the rPP/SEPS blend looses more than 25% in tensile strength and elongation. The yellow index of the blend also changes by more that 50%. Therefore the blend free of UV additive is not suitable for use in long term outdoor applications. Other samples include two types of UV additives, a UV absorber and a hindered amine light stabilizer (HALS). As listed in Table 8, Tinuvin 326 is a benzotriazole based UV absorber produced by Ciba; Tinuvin 783 is a proprietary mixture of oligomeric hindered amine stabilizers produced by Ciba; and Tinuvin 791 is another proprietary mixture of oligomeric hindered amine stabilizers produced by Ciba. The Cyasorb UV additives are proprietarily formulated additive packages provided by Cytec industry. Table 8 illustrates that adding benzotriazole UV absorber and HALS simultaneously each at level of 0.2 to 0.3 wt % can effectively protect the blend of rPP/SEPS from UV degradation and make it suitable for outdoor applications.

Example 8

A silver-based antimicrobial additives is added at level of 0.5 to 2 wt % into a polyolefin-based liner layer, which is the fluid path of the multilayer tubing, to protect the tubing fluid path from fouling effects of bacteria, fungus, mold, and other microbes. For example, 1% silver-based AlphaSan® antimicrobial from Milliken is added into a polyolefin resin. Antimicrobial efficacy testing on the sample conducted in Antimicrobial Test Laboratories according to method prescribed by ASTM E 2149 shows a greater than >99.9% kill rate against the microorganism of S. aureus 6538.

Example 9

Monolayer or multilayer tubing made from blends of rPP/styrenic block copolymers can also be used as peristaltic pumping tube. A Masterflex® rotational peristaltic pump provided by Cole Palmer is used to perform pumping life tests. Tubing samples of ¼" OD ⅜" ID are tested at 600 rpm using a standard pump head until a leaking is detected. Pumping life of a monolayer tubing (sample 3) and a multilayer tubing (sample 7) are compared against a commercial f-PVC pumping tubing sold by Saint-Gobain under trade name of Tygon® R3603. As illustrated in the following table, both the monolayer or multilayer tubing show similar or longer pumping life than the f-PVC tubing.

TABLE 9

Pump Life

| Tubing ID | Pump life, hr | Std. Dev., hr |
|---|---|---|
| Sample 3 | 51.8 | 3.9 |
| Sample 7 | 90.5 | 57.3 |
| Tygon R3603 | 46.1 | 2.9 |

Pump Life is defined as the average pump life for a tubing tested as described above in Example 9. The present tubing has a Pump Life of at least 50 hours, such as at least 60 hours, at least 70 hours, or even at least 80 hours. As illustrated above, the Pump Like may be at least 90 hours.

In a particular embodiment, a flexible tube includes a first layer comprising a polyolefin material having a flexural modulus of not greater than 150 MPa and includes a second layer directly bonded to and in direct contact with the first layer. The second layer comprising a blend of propylenic polymer and styrenic block copolymer.

In another embodiment, a flexible tube includes a first layer comprising a polyolefin having a flexural modulus of not greater than 150 MPa. The first layer forms an inner surface of the flexible tube. The inner surface defines a lumen. The flexible tube also includes a second layer in direct contact with the first layer. The second layer includes a blend of propylenic polymer and styrenic block copolymer and has a loss tangent value (tan δ) at 25° C. of at least 0.1.

In a further embodiment, a method of forming a flexible tube includes extruding a first layer comprising polyolefin. The first layer has a flexural modulus of not greater than 150 MPa. The method also includes coextruding with the first layer a second layer directly contacting and bonded directly to the first layer. The second layer includes a blend of propylenic polymer and styrenic block copolymer.

In an additional embodiment, a flexible tube includes a blend of propylenic polymer and styrenic block copolymer. The blend has a loss tangent value (tan δ) at 25° C. of at least 0.1 and is free of plasticizer or processing aid.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of forming a flexible tube, the method comprising:
    extruding a first layer comprising polyolefin, the first layer having a flexural modulus of not greater than 150 MPa; and
    coextruding with the first layer a second layer directly contacting and bonded directly to the first layer, the second layer comprising a polymer blend consisting essentially of propylenic polymer and styrenic block copolymer, the styrenic block copolymer present at an amount of 40% to 90% by weight of the blend, the blend having a loss tangent value (tan δ) at 25° C. of at least 0.1, the blend being free of plasticizer or processing aid.

2. The method of claim 1, wherein the polyolefin has a melt flow index of 1 to 30 dg/min.

3. The method of claim 1, wherein the propylenic polymer has a melt flow index in a range of 0.1 dg/min to 35 dg/min.

4. The method of claim 1, wherein the styrenic block copolymer has a melt flow index of at least 0.5 dg/min.

5. A flexible tube comprising a polymer blend, wherein the polymer blend consists essentially of propylenic polymer and styrenic block copolymer the styrenic block copolymer present at an amount of 40% to 90% by weight of the blend, the blend having a loss tangent value (tan δ) at 25° C. of at least 0.1, the blend being free of plasticizer or processing aid.

6. The flexible tube of claim 5, wherein the loss tangent value is at least 0.3.

7. The flexible tube of claim 5, wherein the blend exhibits a single glass transition temperature within the range of −20° C. to 15° C.

8. The flexible tube of claim 5, wherein the styrenic block copolymer has a melt flow index of at least 0.5 dg/min.

9. The flexible tube of claim 5, wherein the propylenic polymer has a melt flow index in a range of 0.1 dg/min to 35 dg/min.

10. The flexible tube of claim 5, wherein the blend comprises 10 wt % to 60 wt % of the propylenic polymer.

11. The flexible tube of claim 5, wherein the blend comprises 40 wt % to 80 wt % of the styrenic block copolymer.

12. The flexible tube of claim 5, wherein the propylenic polymer is a random copolymer of propylene with a comonomer or a syndiotactic propylene with a comonomer.

13. The flexible tube of claim 12, wherein the comonomer includes ethylene.

14. The flexible tube of claim 12, wherein the comonomer includes α-olefin.

15. The flexible tube of claim 5, wherein the styrenic block copolymer includes styrene-ethylene-butylene-styrene copolymer, styrene-ethylene-propylene-styrene copolymer, styrene-ethylene-ethylene-propylene-styrene copolymer, styrene-ethylene-ethylene-butylene-styrene copolymer, or any combination thereof.

16. The flexible tube of claim 5, wherein the blend has a shore A hardness in a range of 40 to 90.

17. The flexible tube of claim 5, wherein the blend has a Young's modulus not greater than 100 MPa, a 100% Modulus in a range of 0.8 to 15 MPa, a 300% Modulus in a range of 0.4 to 6 MPa, an elongation in a range of 300% to 1500%, or any combination thereof.

18. The flexible tube of claim 5, wherein the flexible tube has a Pump Life of at least 50 hours.

19. A flexible tube comprising a polymer blend consisting essentially of comprising propylenic polymer in a range of 10 wt % to 60 wt % and styrenic block copolymer in a range of 40 wt % to 90 wt %, the blend exhibiting a loss tangent value (tan δ) at 25° C. of at least 0.1.

20. The flexible tube of claim 19, wherein the flexible tube has a Pump Life of at least 50 hours.

* * * * *

UNITED STATES PATENT AND TRADEMARK OFFICE
CERTIFICATE OF CORRECTION

PATENT NO. : 9,625,061 B2
APPLICATION NO. : 14/261578
DATED : April 18, 2017
INVENTOR(S) : Zhizhong Liu et al.

Page 1 of 1

It is certified that error appears in the above-identified patent and that said Letters Patent is hereby corrected as shown below:

In the Claims

Column 20, Line 7, "copolymer the" should read --copolymer, the--; and
Line 49, "of comprising propylenic" should read --of propylenic--.

Signed and Sealed this
Twenty-third Day of April, 2019

Andrei Iancu
*Director of the United States Patent and Trademark Office*